US011460905B2

(12) United States Patent
Ding et al.

(10) Patent No.: US 11,460,905 B2
(45) Date of Patent: Oct. 4, 2022

(54) FREQUENCY SCALING RESPONDING TO A PERFORMANCE CHANGE METHOD AND APPARATUS AND COMPUTER-READABLE STORAGE MEDIUM

(71) Applicant: HUAWEI TECHNOLOGIES CO., LTD., Guangdong (CN)

(72) Inventors: Qing Ding, Shanghai (CN); Peng Li, Shenzhen (CN); Nianxian Lin, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 17/177,881

(22) Filed: Feb. 17, 2021

(65) Prior Publication Data
US 2021/0165477 A1   Jun. 3, 2021

Related U.S. Application Data

(63) Continuation of application No. PCT/CN2018/103307, filed on Aug. 30, 2018.

(51) Int. Cl.
*G06F 1/324* (2019.01)
*G06F 1/3218* (2019.01)
(Continued)

(52) U.S. Cl.
CPC ............ *G06F 1/324* (2013.01); *G06F 1/3218* (2013.01); *G06F 1/3228* (2013.01);
(Continued)

(58) Field of Classification Search
CPC ...... G06F 1/3218; G06F 1/3228; G06F 1/324; G06F 1/3243; G06F 1/3296;
(Continued)

(56) References Cited

U.S. PATENT DOCUMENTS

2005/0057571 A1 *   3/2005   Stevens .................. H04N 19/14
                                                  702/182
2006/0020838 A1     1/2006   Tschanz et al.
(Continued)

FOREIGN PATENT DOCUMENTS

CN      102609319 A     7/2012
CN      103019367 A     4/2013
(Continued)

OTHER PUBLICATIONS

Extended European Search Report issued in European Application No. 18932041.9 dated Jun. 9, 2021, 8 pages.
(Continued)

*Primary Examiner* — Chun Cao
(74) *Attorney, Agent, or Firm* — Fish & Richardson P.C.

(57) ABSTRACT

This application provides a frequency scaling method. The method includes: predicting an energy efficiency parameter for processing a current frame of an image by at least one module; and selecting, from a plurality of frequency sets based on the predicted energy efficiency parameter, a first frequency set that meets an energy efficiency requirement, and scaling a working frequency of each of the at least one module for processing the current frame to a preset frequency corresponding to each of the at least one module. According to the technical solutions provided in the embodiments of this application, a load change requirement can be responded to in time in a frequency scaling process.

17 Claims, 5 Drawing Sheets

(51) Int. Cl.
*G06F 1/3228* (2019.01)
*G06F 1/3234* (2019.01)
*G06F 1/3296* (2019.01)
*G06F 9/48* (2006.01)

(52) U.S. Cl.
CPC .......... *G06F 1/3243* (2013.01); *G06F 1/3296* (2013.01); *G06F 9/4893* (2013.01)

(58) Field of Classification Search
CPC .... G06F 9/4893; G06F 1/3206; G06F 1/3225; G06F 1/3275; G06F 1/3278; G06F 9/5094; Y02D 10/00
USPC ......................................................... 713/322
See application file for complete search history.

(56) References Cited

U.S. PATENT DOCUMENTS

| | | | |
|---|---|---|---|
| 2007/0050647 A1* | 3/2007 | Conroy | G06F 1/3203 713/300 |
| 2009/0013201 A1* | 1/2009 | He | G06F 1/3203 713/322 |
| 2011/0320846 A1 | 12/2011 | David et al. | |
| 2014/0063026 A1* | 3/2014 | Oh | G06F 1/3203 345/519 |
| 2014/0184619 A1* | 7/2014 | Kim | G06F 1/324 345/519 |
| 2015/0178987 A1* | 6/2015 | Hurd | G06F 1/3203 345/420 |
| 2015/0317762 A1 | 11/2015 | Park et al. | |
| 2017/0092340 A1* | 3/2017 | Zheng | G09G 5/18 |

FOREIGN PATENT DOCUMENTS

| | | |
|---|---|---|
| CN | 105045367 A | 11/2015 |
| CN | 105677482 A | 6/2016 |
| CN | 106258011 A | 12/2016 |
| CN | 107465929 A | 12/2017 |
| CN | 107678855 A | 2/2018 |

OTHER PUBLICATIONS

PCT International Search Report and Written Opinion issued in International Application No. PCT/CN2018/103307 dated Jun. 6, 2019, 16 pages (with English translation).
Office Action issued in Chinese Application No. 201880091791.X dated Sep. 10, 2021, 16 pages (with English translation).

* cited by examiner

FREQUENCY SCALING RESPONDING TO A PERFORMANCE CHANGE METHOD AND APPARATUS AND COMPUTER-READABLE STORAGE MEDIUM

CROSS-REFERENCE TO RELATED APPLICATIONS

This application is a continuation of International Application No. PCT/CN2018/103307, filed on Aug. 30, 2018, the disclosure of which is hereby incorporated by reference in its entirety.

TECHNICAL FIELD

This application relates to the field of electronic technologies, and more specifically, to a frequency scaling method and apparatus and a computer-readable storage medium.

BACKGROUND

In recent years, with the rapid development of mobile devices, especially smartphones, a mobile use habit means that a user has a high requirement on power consumption and heat generation of a smartphone. To reduce the power consumption of the smartphone and prolong a battery life of the smartphone, a frequency of a central processing unit (CPU) may be scaled based on a load. In this way, the frequency of the CPU can quickly respond to a load requirement (or a performance requirement), to reduce the power consumption of the smartphone and prolong the battery life of the smartphone.

In the prior art, a window assisted load tracking (WALT) method or a per-entity load tracking (PELT) method is used for frequency scaling scheduling. When WALT is used, a duty cycle or CPU usage in a current window can be calculated based on duty cycles or CPU usage in N historical non-empty windows of a task by using a defined statistics policy, and the frequency can be scaled level by level. However, in the prior art, frequency scaling performed level by level based on predicted CPU usage by using a window size as a period cannot timely respond to a change of the performance requirement. Other similar components also have a frequency scaling problem similar to the problem in the CPU.

Therefore, in a frequency scaling process, how to timely respond to a performance change of the task and reduce power consumption has become an urgent problem to be resolved.

SUMMARY

This application provides a frequency scaling method and apparatus, so that a load change requirement can be responded to in time in a frequency scaling process.

According to a first aspect, a frequency scaling method is provided. The method includes: predicting an energy efficiency parameter for processing a current frame of an image by at least one module, selecting a first frequency set from a plurality of frequency sets based on the predicted energy efficiency parameter, and scaling a working frequency of each of the at least one module for processing the current frame to a preset frequency corresponding to each of the at least one module.

It should be understood that the at least one module for processing the image includes at least one of a central processing unit (CPU), a graphics processing unit (GPU), an internal memory (which may be, for example, a DDR memory) configured to store the current frame, or a neural network processing unit (NPU). It should be further understood that the first frequency set includes the preset frequency corresponding to each of the at least one module.

In this embodiment of this application, there are a plurality of implementations for predicting the energy efficiency parameter for processing the current frame by the at least one module. This is not specifically limited in this application. The energy efficiency parameter for processing the current frame may be predicted based on a historical energy efficiency parameter (which may be obtained based on an energy efficiency parameter of at least one frame before the current frame). For example, the energy efficiency parameter for processing the current frame may be predicted based on an average value of the historical energy efficiency parameters. For another example, a load prediction table may be constructed and searched based on the historical energy efficiency parameter, so that the energy efficiency parameter for processing the current frame may be predicted based on the load prediction table.

In this embodiment of this application, a load change requirement can be responded to in time in a frequency scaling process, and a good performance gain and/or a power consumption reduction gain can be obtained.

With reference to the first aspect, in some implementations of the first aspect, the energy efficiency parameter includes at least one of the following: a quantity of instructions for processing the current frame by the CPU, a cache miss generated when the CPU processes the current frame, a quantity of draw calls for processing the current frame by the CPU, a bandwidth for reading or storing the current frame by the memory, or a calculation amount for processing the current frame by the NPU.

Optionally, in some embodiments, if the CPU processes the current frame of the image, the energy efficiency parameter that is of the CPU and that is predicted in this embodiment of this application may include but is not limited to at least one of the following parameters: a quantity of instructions for processing the current frame by the CPU, a cache miss (for example, one or all of the following: times of level-1 data cache misses (L1 data cache misses) or times of level-2 cache misses (L2 data cache misses)) generated when the CPU processes the current frame, times of no operation issued due to frontend for the CPU (which may also be referred to as FE bound), and times of no operation issued due to backend for the CPU (which may also be referred to as BE bound).

Optionally, in some embodiments, if the CPU processes the current frame of the image, the energy efficiency parameter that is of the CPU and that is predicted in this embodiment of this application may include but is not limited to at least one of the following parameters: a quantity of draw calls for processing the current frame by the CPU, a quantity of drawn triangles, times of total-fragment (total-FRAG) of a pixel, and times of texture-operation (TEX-operation).

Optionally, in some embodiments, if a memory (for example, a DDR memory) that stores the current frame is configured, the energy efficiency parameter that is of the memory and that is predicted in this embodiment of this application may include but is not limited to a bandwidth for reading or storing the current frame by the memory.

Optionally, in some embodiments, if the NPU processes the current frame of the image, the energy efficiency parameter that is of the NPU and that is predicted in this embodiment of this application may include but is not limited to at least one of the following parameters: a calculation amount (tasks) for processing the current frame by the NPU, the total of instructions needed to execute the current frame (total-INSTR-EXEC), and the total of memory requests (total-MEM-request) of the NPU.

With reference to the first aspect, in some implementations of the first aspect, the first frequency set meets an energy efficiency requirement, and the energy efficiency requirement includes at least one of the following: a power consumption requirement or a performance requirement.

In this embodiment of this application, the energy efficiency requirement may be used to indicate that a preset frequency of the current frame meets the performance requirement, or may be used to indicate that a preset frequency of the current frame meets the power consumption requirement. This is not specifically limited in this application. In an example, the performance characteristic (for example, a running time period corresponding to the at least one module) corresponding to each of the plurality of frequency sets may be predicted based on the predicted energy efficiency parameter. In another example, power consumption (for example, power consumption for processing the current frame by the at least one module) corresponding to a plurality of frequency sets in the first frequency set may be further predicted based on the predicted energy efficiency parameter, and a frequency set corresponding to lowest power consumption may be selected from the first frequency set according to a power consumption formula corresponding to the at least one module.

With reference to the first aspect, in some implementations of the first aspect, the power consumption requirement is a minimum power consumption requirement, and the performance requirement is that performance characteristic meets a preset threshold.

It should be understood that the preset threshold may be less than or equal to a time threshold. In an example, the time threshold may be duration that is required by each frame and that is obtained through calculation based on a target frame rate. A 60-frame game is used as an example, and duration required by each frame is 16.6 ms (1000/60).

With reference to the first aspect, in some implementations of the first aspect, a performance characteristic corresponding to each frequency set is predicted based on the predicted energy efficiency parameter; and the first frequency set corresponding to the performance characteristic meeting the preset threshold is selected from the plurality of frequency sets.

Specifically, the first frequency set corresponding to the performance characteristic meeting the preset threshold may be selected from the plurality of frequency sets based on the predicted energy efficiency parameter and a performance formula.

It should be understood that a running time period corresponding to a preset frequency that is of the at least one module and that is in the first frequency set meets the prediction threshold, and the performance formula is used to indicate a function relationship between a running time period and the energy efficiency parameter that are of the at least one module.

In this embodiment of this application, the performance formula $y=f(x)$ of the at least one module may be deduced based on a running parameter (for example, the running time period) and the energy efficiency parameter that are of the at least one module.

It should be understood that the performance formula $y=f(x)$ may be used to indicate a function relationship between the running parameter (for example, the running time period) and the energy efficiency parameter that are of the at least one module, where x may be an independent variable (for example, the energy efficiency parameter of the at least one module), and y may be a dependent variable (for example, a running time period for processing any frame by the at least one module).

The performance formula $y=f(x)$ is not specifically limited in this embodiment of this application. The function relationship between x and y may be linear, or may be non-linear.

With reference to the first aspect, in some implementations of the first aspect, power consumption corresponding to each frequency set is predicted based on the predicted energy efficiency parameter; a plurality of second frequency sets corresponding to a plurality of performance characteristics meeting the preset threshold are selected front the plurality of frequency sets; and the first frequency set corresponding to lowest power consumption is selected from the plurality of second frequency sets.

Specifically, the plurality of second frequency sets corresponding to the plurality of performance characteristics meeting the preset threshold may be selected from the plurality of frequency sets based on the predicted energy efficiency parameter and a power consumption formula. The first frequency set corresponding to the lowest power consumption is selected from the plurality of second frequency sets.

It should be understood that the plurality of second frequency sets meeting the performance requirement may be selected from the plurality of frequency sets based on the predicted energy efficiency parameter and the performance formula. The first frequency set corresponding to the lowest power consumption may also be selected from the plurality of second frequency sets based on the predicted energy efficiency parameter and the power consumption formula.

The power consumption formula is used to indicate a functional relationship between the power consumption currently for processing the current frame by the at least one module and the energy efficiency parameter of the at least one module.

In this embodiment of this application, a power consumption formula $p=f(y)$ of the at least one module may be deduced based on a power consumption parameter and the energy efficiency parameter that are of the at least one module.

It should be understood that the power consumption formula $p=f(y)$ may be used to indicate a function relationship between the power consumption parameter and the energy efficiency parameter that are of the at least one module, where y may be an independent variable, and y may be an output value of the performance formula, for example, the running time period for processing any frame by the at least one module; and p may be a dependent variable, for example, power consumption for processing the current frame of the image by the at least one module.

The power consumption formula $p=f(y)$ is not specifically limited in this embodiment of this application. The function relationship between y and p may be linear, or may be non-linear.

With reference to the first aspect, in some implementations of the first aspect, the energy efficiency parameter for processing the current frame of the image by the at least one module is predicted based on a historical energy efficiency parameter. The historical energy efficiency parameter is obtained based on an energy efficiency parameter of at least one frame before the current frame.

With reference to the first aspect, in some implementations of the first aspect, a load prediction table is searched based on the historical energy efficiency parameter, to predict the energy efficiency parameter for processing the current frame of the image by the at least one module.

With reference to the first aspect, in some implementations of the first aspect, the load prediction table indicates at least a change trend of the plurality of historical energy efficiency parameters or directly indicates a correspondence between the plurality of historical energy efficiency parameters and the predicted energy efficiency parameter.

According to a second aspect, a frequency scaling apparatus is provided. The apparatus includes a prediction module, a determining module, and a processing module. The prediction module is configured to predict an energy efficiency parameter for processing a current frame of an image by at least one module, where the at least one module includes at least one of a central processing unit (CPU), a graphics processing unit (GPU), a memory configured to store the current frame, or a neural network processing unit (NPU). The determining module is configured to select a first frequency set from a plurality of frequency sets based on the predicted energy efficiency parameter, where the first frequency set includes a preset frequency corresponding to each of the at least one module. The processing module is configured to scale a working frequency of each of the at least one module for processing the current frame to the preset frequency corresponding to each of the at least one module.

With reference to the second aspect, in some implementations of the second aspect, the energy efficiency parameter includes at least one of the following: a quantity of instructions for processing the current frame by the CPU, a cache miss generated when the CPU processes the current frame, a quantity of draw calls for processing the current frame by the GPU, a bandwidth for reading or storing the current frame by the memory, or a calculation amount for processing the current frame by the NPU.

With reference to the second aspect, in some implementations of the second aspect, the first frequency set meets an energy efficiency requirement, and the energy efficiency requirement includes at least one of the following: a power consumption requirement or a performance requirement.

With reference to the second aspect, in some implementations of the second aspect, the power consumption requirement is a minimum power consumption requirement, and the performance requirement is that a performance characteristic meets a preset threshold.

With reference to the second aspect, in some implementations of the second aspect, the determining module is specifically configured to: predict, based on the predicted energy efficiency parameter, a performance characteristic corresponding to each frequency set; and select, from the plurality of frequency sets, the first frequency set corresponding to the performance characteristic meeting the preset threshold.

With reference to the second aspect, in some implementations of the second aspect, the determining module is further specifically configured to: predict, based on the predicted energy efficiency parameter, power consumption corresponding to each frequency set; select, from the plurality of frequency sets, a plurality of second frequency sets corresponding to a plurality of performance characteristics meeting the preset threshold; and select, from the plurality of second frequency sets, the first frequency set corresponding to lowest power consumption.

With reference to the second aspect, in some implementations of the second aspect, the prediction module is specifically configured to: predict, based on a historical energy efficiency parameter, the energy efficiency parameter for processing the current frame of the image by the at least one module, where the historical energy efficiency parameter is obtained based on an energy efficiency parameter of at least one frame before the current frame.

With reference to the second aspect, in some implementations of the second aspect, the prediction module is specifically configured to: search a load prediction table based on the historical energy efficiency parameter, to predict the energy efficiency parameter for processing the current frame of the image by the at least one module.

According to a third aspect, a frequency scaling system is provided. The apparatus includes a memory and a processor. The memory is configured to store a program. The processor is configured to execute the program stored in the memory, and when the program is executed, the processor performs the method according to any one of the first aspect or the possible implementations of the first aspect. For example, the processor may further be in communication connection with a transceiver. For example, the memory may be configured to store program code and data of the device. Therefore, the memory may be a storage unit in the processor, an external storage unit independent of the processor, or a component including a storage unit in the processor and an external storage unit independent of the processor.

Optionally, the processor may be a general-purpose processor, and may implement the method procedure by using hardware, or may implement the procedure by executing software. When the method procedure is implemented by the hardware, the processor may include a microprocessor, a digital signal processor, a microcontroller, the CPU, or the like that has a logic circuit, an integrated circuit, or the like. A function is implemented by reading software code stored in the memory. The memory may be integrated into the processor, or may be located outside the processor independently. Further, the processor may include a necessary hardware accelerator, for example, a hardware algorithm circuit, a logical operation circuit, or an analog circuit that does not depend on software to perform an operation.

When the program is executed, the processor is configured to predict an energy efficiency parameter for processing a current frame of an image by at least one module. The at least one module includes at least one of a central processing unit (CPU), a graphics processing unit (GPU), a memory configured to store the current frame, or a neural network processing unit (NPU). The processor is further configured to select a first frequency set front a plurality of frequency sets based on the predicted energy efficiency parameter, where the first frequency set includes a preset frequency corresponding to each of the at least one module. The processor is further configured to scale a working frequency of each of the at least one module for processing the current frame to the preset frequency corresponding to each of the at least one module.

With reference to the third aspect, in some implementations of the third aspect, the energy efficiency parameter includes at least one of the following: a quantity of instructions for processing the current frame by the CPU, a cache miss generated when the CPU processes the current frame, a quantity of draw calls for processing the current frame by the GPU, a bandwidth for reading or storing the current frame by the memory, or a calculation amount for processing the current frame by the NPU.

With reference to the third aspect, in some implementations of the third aspect, the first frequency set meets an energy efficiency requirement, and the energy efficiency requirement includes at least one of the following: a power consumption requirement or a performance requirement.

With reference to the third aspect, in some implementations of the third aspect, the power consumption requirement is a minimum power consumption requirement, and the performance requirement is that a performance characteristic meets a preset threshold.

With reference to the third aspect, in some implementations of the third aspect, the processor is specifically configured to: predict, based on the predicted energy efficiency parameter, a performance characteristic corresponding to each frequency set; and select, from the plurality of frequency sets, the first frequency set corresponding to the performance characteristic meeting the preset threshold.

With reference to the third aspect, in some implementations of the third aspect, the processor is further specifically configured to: predict, based on the predicted energy efficiency parameter, power consumption corresponding to each frequency set; select, from the plurality of frequency sets, a plurality of second frequency sets corresponding to a plurality of performance characteristics meeting the preset threshold; and select, from the plurality of second frequency sets, the first frequency set corresponding to lowest power consumption.

With reference to the third aspect, in some implementations of the third aspect, the processor is specifically configured to: predict, based on a historical energy efficiency parameter, the energy efficiency parameter for processing the current frame of the image by the at least one module, where the historical energy efficiency parameter is obtained based on an energy efficiency parameter of at least one frame before the current frame.

With reference to the third aspect, in some implementations of the third aspect, the processor is specifically configured to: search a load prediction table based on the historical energy efficiency parameter, to predict the energy efficiency parameter for processing the current frame of the image by the at least one module.

According to a fourth aspect, a chip is provided, including a processor and an interface that couples the processor to an outer part of the chip. For example, the interface may be coupled to a memory outside the chip, and the memory may be configured to store program code and data of the device. For specific descriptions of the memory and the processor, refer to the descriptions of the third aspect or any implementation of the third aspect. The processor may read program code from the memory by using the interface, to perform the operation.

When the program is executed, the processor is configured to predict an energy efficiency parameter for processing a current frame of an image by at least one module. The at least one module includes at least one of a central processing unit (CPU), a graphics processing unit (GPU), a memory configured to store the current frame, or a neural network processing unit (NPU). The processor is further configured to select a first frequency set from a plurality of frequency sets based on the predicted energy efficiency parameter, where the first frequency set includes a preset frequency corresponding to each of the at least one module. The processor is further configured to scale a working frequency of each of the at least one module for processing the current frame to the preset frequency corresponding to each of the at least one module.

With reference to the fourth aspect, in some implementations of the fourth aspect, the energy efficiency parameter includes at least one of the following: a quantity of instructions for processing the current frame by the CPU, a cache miss generated when the CPU processes the current frame, a quantity of draw calls for processing the current frame by the GPU, a bandwidth for reading or storing the current frame by the memory, or a calculation amount for processing the current frame by the NPU.

With reference to the fourth aspect, in some implementations of the fourth aspect, the first frequency set meets an energy efficiency requirement, and the energy efficiency requirement includes at least one of the following: a power consumption requirement or a performance requirement.

With reference to the fourth aspect, in some implementations of the fourth aspect, the power consumption requirement is a minimum power consumption requirement, and the performance requirement is that a performance characteristic meets a preset threshold.

With reference to the fourth aspect, in some implementations of the fourth aspect, the processor is specifically configured to: predict, based on the predicted energy efficiency parameter, a performance characteristic corresponding to each frequency set; and select, from the plurality of frequency sets, the first frequency set corresponding to the performance characteristic meeting the preset threshold.

With reference to the fourth aspect, in some implementations of the fourth aspect, the processor is further specifically configured to: predict, based on the predicted energy efficiency parameter, power consumption corresponding to each frequency set; select, from the plurality of frequency sets, a plurality of second frequency sets corresponding to a plurality of performance characteristics meeting the preset threshold; and select, from the plurality of second frequency sets, the first frequency set corresponding to lowest power consumption.

With reference to the fourth aspect, in some implementations of the fourth aspect, the processor is specifically configured to: predict, based on a historical energy efficiency parameter, the energy efficiency parameter for processing the current frame of the image by the at least one module, where the historical energy efficiency parameter is obtained based on an energy efficiency parameter of at least one frame before the current frame.

With reference to the fourth aspect, in some implementations of the fourth aspect, the processor is specifically configured to: search a load prediction table based on the historical energy efficiency parameter, to predict the energy efficiency parameter for processing the current frame of the image by the at least one module.

According to a fifth aspect, a computer-readable storage medium is provided, including a computer program. When the computer program is run on a computer or a processor, the computer or the processor is enabled to perform the method according to any one of the first aspect or the implementations of the first aspect.

According to a sixth aspect, a computer program product is provided. When the computer program product is run on a computer or a processor, the computer or the processor is enabled to perform the method according to any one of the first aspect or the implementations of the first aspect.

DESCRIPTION OF EMBODIMENTS

Figure 1:
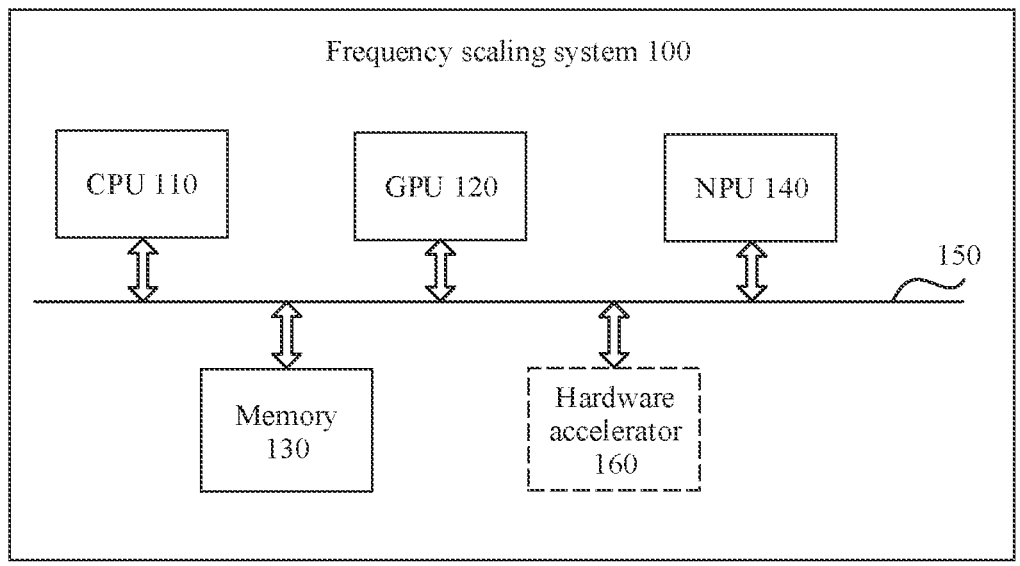
FIG. 1 is a schematic block diagram of a frequency scaling system 100 according to an embodiment of this application.

The following describes technical solutions of this application with reference to accompanying drawings. In recent years, the rapid development of mobile devices, especially smartphones, makes smartphones play an increasingly important role in daily life. At the same time, applications running on smartphones are increasingly diversified, and naturally users have increasing performance requirements. However, a mobile use habit means that a user has a high requirement on power consumption and heat generation of a smartphone. How to reduce power consumption, prolong a battery life of the smartphone, and reduce heat generation while meeting the performance requirements has become a common concern of the industry and consumers.

To reduce the power consumption of the smartphone and prolong the battery life of the smartphone, frequencies of one or more of the following modules (for example, a central processing unit (CPU), a graphics processing unit (GPU), and a double rate (DDR) memory) may be scaled based on load. In this way, the frequencies of the one or more modules can quickly respond to a load requirement (a performance requirement and/or a power requirement), to reduce power consumption of the smartphone, and prolong the battery life of the smartphone.

To overcome a prior-art problem that a load change requirement cannot be responded to in time because a frequency of a CPU is scaled level by level based on predicted CPU usage of a current window, in the frequency scaling method provided in this embodiment of this application, the frequencies of the at least one module (for example, the CPU, the GPU, the DDR, or an NPU) may be scaled to predicted frequencies based on predicted frame information (which may also be referred to as an energy efficiency parameter of the at least one module) by using a frame as a granularity. In the solution of this embodiment, the scaling is performed by using the frame as the granularity, so that the load change requirement can be responded to in time, and a good performance gain and/or a power consumption reduction gain can be obtained.

The frequency scaling method in the embodiments of this application may be applicable but is not limited to a game field, a video field, or another general application field. This solution is applicable to all fields with image processing. The following uses the game field as an example to describe in detail that in this embodiment of this application, the frequencies of the at least one module (for example, the CPU, the GPU, the DDR, or the NPU) are scaled to predicted frequencies based on the predicted frame information by using the frame as the granularity, so that the load change requirement can be responded to in time. The NPU in this embodiment is an artificial intelligence operation unit, and may perform calculation by using, for example, a convolutional neural network (CNN).

In an aspect, for the game field, the most important indicator of game performance is frame rate. The frame rate may be a measurement used to measure a quantity of frames for displaying an image, in other words, the frame rate may be used to measure a quantity of frames per second (FPS). The quantity of FPS or the frame rate can represent the times that the GPU can update the image per second. Due to a special physiological function of human eyes, if a frame rate of a viewed image is higher than a specified threshold, the image can be considered as coherent. A higher frame rate can be used to obtain a smoother game image, and reflect a more vivid animation.

It should be understood that the frame in this embodiment may be a static image formed by segmented data. Therefore, as long as the frame can be executed within a specified time period (for example, duration of each frame is 16.6 ms (1000/60) for a game with 60 frames), a performance requirement of the game can be ensured. For modules such as the CPU, the GPU, and the DDR, frequency scaling may be performed based on the frame, so that an instruction required by each frame is completed within the specified time period (for example, the duration of each frame is 16.6 ms (1000/60) for the game with 60 frames), to ensure the game performance.

In another aspect, in a process of performing frequency scaling on the at least one module (for example, the CPU, the GPU, the DDR, or the NPU), a preset frequency that meets a performance requirement and a power consumption requirement may be predicted based on the predicted energy efficiency parameter of the at least one module (predicted parameter information for processing a current frame by the at least one module). In addition, a working frequency of each of the at least one module may be scaled to the preset frequency.

FIG. 1 is a schematic block diagram of a frequency scaling system 100 according to an embodiment of this application. The frequency scaling system 100 may include a CPU 110, a GPU 120, a memory 130, an NPU 140, and a bus 150. The frequency scaling system 100 in FIG. 1 may be included in one or more chips, to form an electronic system. The system may be located in an electronic device, and the electronic device may be a wireless terminal, a wired terminal, user equipment, or a connectionless device. For example, the electronic device may be a mobile phone, a laptop computer, a tablet computer, or a game console.

Referring to FIG. 1, the memory 130 may be, for example, a DDR memory, and the memory 130 may be configured to store program code and data of the frequency scaling system 100. The memory 130 may be connected to the CPU 110, the GPU 120, and the NPU 140 by using the bus 150.

It should be understood that the bus 150 may be any type of bus such as a peripheral component interconnect (PCI) bus or an extended industry standard architecture (EISA) bus. The bus 150 may be classified into an address bus, a data bus, a control bus, and the like. For ease of representation, only one line is used to represent the bus in FIG. 1, but this does not mean that there is only one bus or only one type of bus.

The CPU 110, the GPU 120, and the NPU 140 shown in FIG. 1 may be configured to process an image. The CPU 110, the GPU 120, and the NPU 140 may be on a chip, and read software code stored in the memory 130 by using an interface that is coupled to an outer part of the chip, to implement a corresponding function. The software code is read into the chip from the memory 130 by using the interface and the bus 150 and is used by at least one of the CPU 110, the GPU 120, or the NPU 140.

Optionally, in some embodiments, the frequency scaling system 100 may further include a hardware accelerator 160. The hardware accelerator 160 may include an application-specific integrated circuit (ASIC), a field programmable gate array (FPGA) or another programmable logic device, a transistor logic device, a hardware component, or any combination thereof.

Figure 2:
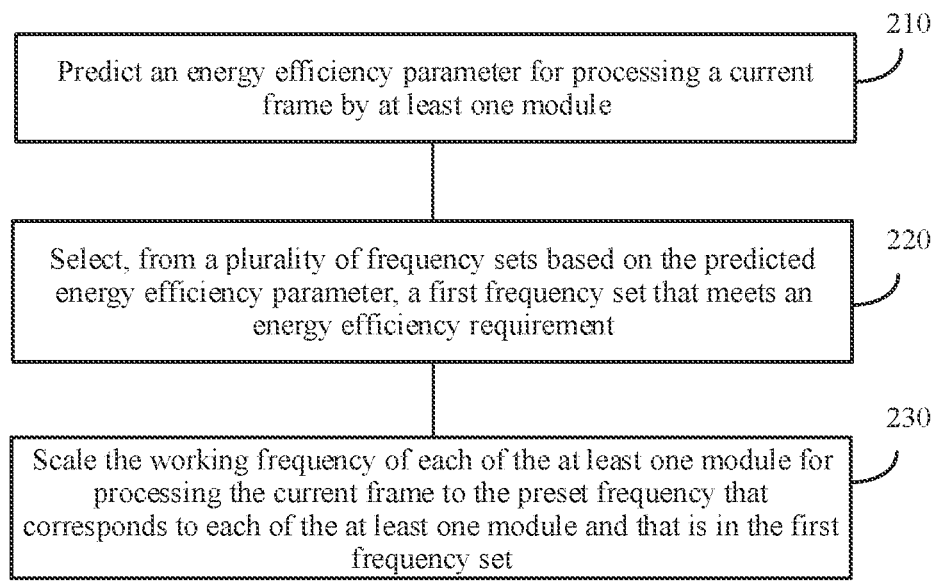
FIG. 2 is a schematic flowchart of a frequency scaling method according to an embodiment of this application.

With reference to a hardware system architecture (the frequency scaling system 100) shown in FIG. 1, the following describes in detail a frequency scaling method provided in an embodiment of this application. FIG. 2 is a schematic flowchart of a frequency scaling method according to an embodiment of this application. The method in FIG. 2 includes steps 210 to 230. The following separately describes the steps 210 to 230 in detail.

Step 210: Predict an energy efficiency parameter for processing a current frame by at least one module. A module for processing a current frame of an image is not specifically limited in this embodiment of this application. The module may be one or more modules in the CPU 110, the GPU 120, the memory 130 (for example, a DDR), or the NPU 140 in the frequency scaling system 100 shown in FIG. 1. In this embodiment of this application, the energy efficiency parameter that is required to process the current frame and that corresponds to the at least one module is not specifically limited. The following describes in detail by using examples, with reference to different modules, the energy efficiency parameter for processing the current frame by the different modules.

Optionally, in some embodiments, if the CPU 110 in the frequency scaling system 100 shown in FIG. 1 processes the current frame of the image, in this embodiment of this application, the predicted energy efficiency parameter of the CPU 110 may include but is not limited to at least one of the following parameters: a quantity of instructions for processing the current frame by the CPU, a cache miss (for example, times of level-1 data cache misses (L1 data cache misses), times of level-2 cache misses (L2 data cache misses)) generated when the CPU processes the current frame, times no operation issued due to frontend for the CPU (which may also be referred to as a frontend bound (FE bound)), and times of no operation issued due to backend for the CPU (which may also be referred to as a backend bound (BE bound)).

Optionally, in some embodiments, if the GPU 120 in the frequency scaling system 100 shown in FIG. 1 processes the current frame of the image, the energy efficiency parameter that is of the GPU 120 and that is predicted in this embodiment of this application may include but is not limited to at least one of the following parameters: a quantity of draw calls for processing the current frame by the GPU, a quantity of drawn triangles, times of total-fragment (total-FRAG) of a pixel, and times of texture-operation (TEX-operation).

Optionally, in some embodiments, if the memory 130 (for example, the DDR) in the frequency scaling system 100 shown in FIG. 1 stores or reads the current frame, in this embodiment of this application, the predicted energy efficiency parameter of the memory 130 may include but is not limited to a bandwidth for storing or reading the current frame by the memory.

Optionally, in some embodiments, if the NPU 140 in the frequency scaling system 100 shown in FIG. 1 processes the current frame of the image, the energy efficiency parameter that is of the NPU 140 and that is predicted in this embodiment of this application may include but is not limited to at least one of the following parameters: a calculation amount (tasks) for processing the current frame by the NPU, the total of instructions needed to execute the current frame (total-INSTR-FXEC), and the total of memory requests (total-MEM-request) of the NPU.

In this embodiment of this application, there are a plurality of implementations for predicting the energy efficiency parameter for processing the current frame by the at least one module shown in FIG. 1. This is not specifically limited in this application. The energy efficiency parameter for processing the current frame may be predicted based on a historical energy efficiency parameter (which may be obtained based on an energy efficiency parameter of at least one frame before the current frame). For example, the energy efficiency parameter for processing the current frame may be predicted based on an average value of the historical energy efficiency parameters. For another example, a load prediction table may be constructed and searched based on the historical energy efficiency parameter, so that the energy efficiency parameter for processing the current frame may be predicted based on the load prediction table. A specific implementation of constructing and searching the load prediction table is described below with reference to FIG. 3. Details are not described herein again.

Step 220: Select, from a plurality of frequency sets based on the predicted energy efficiency parameter, a first frequency set that meets an energy efficiency requirement. The plurality of frequency sets in this embodiment of this application may be used to represent all sets of frequencies or all sets of frequency combinations of the at least one module shown in FIG. 1. It should be noted that modules of different models correspond to different frequency sets. Therefore, a quantity of frequencies or frequency combinations in the plurality of frequency sets is not specifically limited in this embodiment of this application.

In this embodiment of this application, there are a plurality of implementations of selecting, from the plurality of frequency sets based on the predicted energy efficiency parameter, the first frequency set that meets the energy efficiency requirement. This is not specifically limited in this application. It should be understood that the energy efficiency requirement may be used to indicate that a preset frequency of the current frame meets a performance requirement, or may be used to indicate that a preset frequency of the current frame meets a power consumption requirement. This is not specifically limited in this application.

Figure 4:
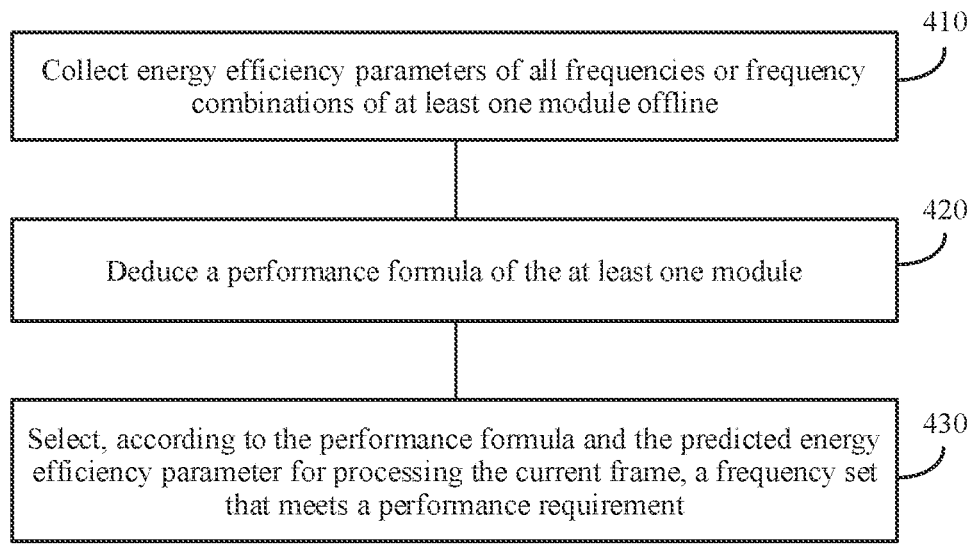
FIG. 4 is a schematic flowchart of a possible preset frequency selection method according to an embodiment of this application.
Figure 5:
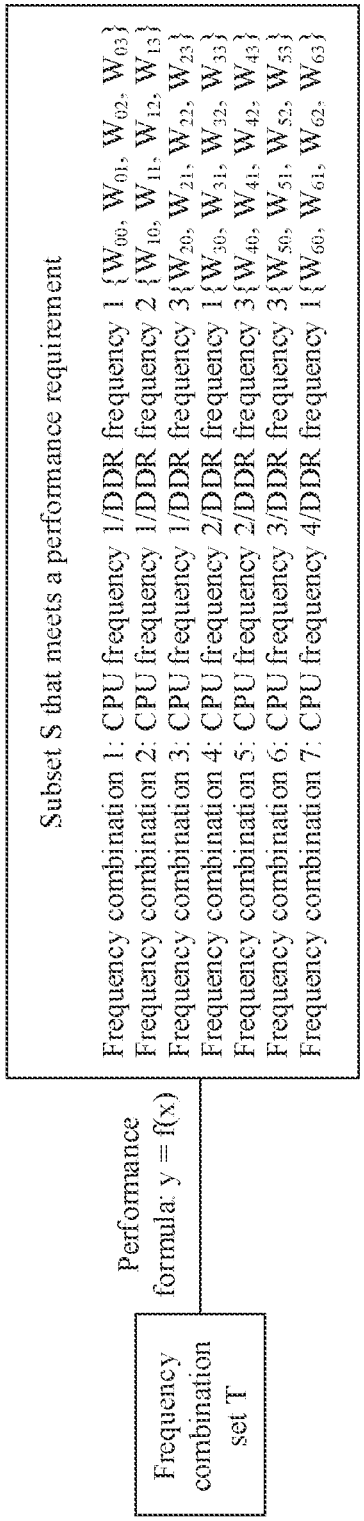
FIG. 5 is a possible schematic diagram of selecting a preset frequency according to an embodiment of this application.

In an example, the performance characteristic (for example, a running time period corresponding to the at least one module shown in FIG. 1) corresponding to each of the plurality of frequency sets may be predicted based on the predicted energy efficiency parameter, and according to a performance formula corresponding to the at least one module, a first frequency set corresponding to a preset threshold (for example, a preset running time period corresponding to the at least one module) that meets the performance requirement may be selected from the plurality of frequency sets. A working frequency of each of the at least one module shown in FIG. 1 may be scaled to a preset frequency in the corresponding first frequency set. With reference to FIG. 4 and FIG. 5, the following describes a specific implementation of selecting, according to the performance formula, a frequency set that meets a performance requirement. Details are not described herein again.

In another example, power consumption (for example, power consumption for processing the current frame by the at least one module shown in FIG. 1) corresponding to a plurality of frequency sets in the first frequency set may be further predicted based on the predicted energy efficiency parameter, and a frequency set corresponding to lowest power consumption may be selected from the first frequency set according to a power consumption formula corresponding to the at least one module. A working frequency of each of the at least one module shown in FIG. 1 may be scaled to a preset frequency in the frequency set corresponding to the lowest power consumption. A specific implementation of selecting, according to the power consumption formula, the frequency set corresponding to the lowest power consumption is described below with reference to FIG. 6. Details are not described herein again.

Step 230: Scale the working frequency of each of the at least one module for processing the current frame to the preset frequency that corresponds to each of the at least one module and that is in the first frequency set. In this embodiment of this application, the frequency set that meets the performance requirement may be selected according to the performance formula in the step 220, and the working frequency of each of the at least one module for processing the current frame shown in FIG. 1 may be scaled to the preset frequency that corresponds to each of the at least one module and that is in the frequency set that meets the performance requirement. Alternatively, the frequency set corresponding to the lowest power consumption may be selected according to the power consumption formula in the step 220, and the working frequency of each of the at least one module shown in FIG. 1 for processing the current frame may be scaled to the preset frequency that corresponds to each of the at least one module and that is in the frequency set corresponding to the lowest power consumption. This is not specifically limited in this embodiment of this application.

In this embodiment of this application, a load change requirement can be responded to in time in a frequency scaling process, and a good performance gain and/or a power consumption reduction gain can be obtained.

Figure 3:
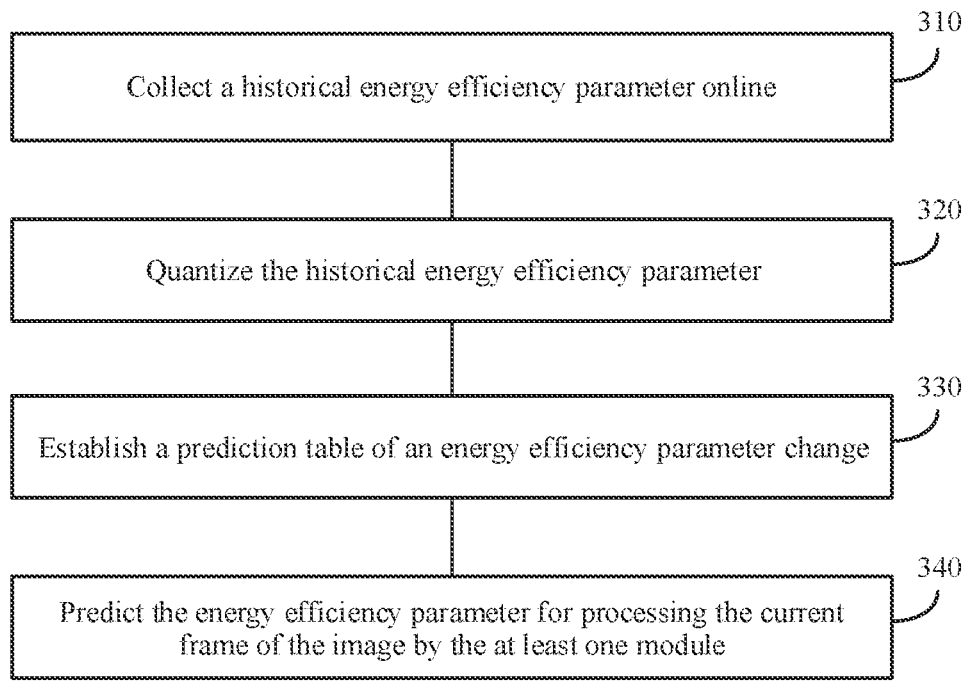
FIG. 3 is a schematic flowchart of a method for predicting an energy efficiency parameter according to an embodiment of this application.

With reference to a specific example in FIG. 3, the following describes in more detail a specific implementation of creating and searching the load prediction table based on the historical energy efficiency parameter to predict the energy efficiency parameter for processing the current frame in this embodiment of this application. It should be noted that the example in FIG. 3 is merely intended to help a person skilled in the art understand the embodiments of this application, instead of limiting the embodiments of this application to a specific value or a specific scenario shown in the example. A person skilled in the art can apparently make various equivalent modifications or changes according to the examples shown in FIG. 3, and such modifications and changes also fall within the scope of the embodiments of this application.

FIG. 3 is a schematic flowchart of a method for predicting an energy efficiency parameter according to an embodiment of this application. The method in FIG. 3 may include steps 310 to 340. The following separately describes the steps 310 to 340 in detail.

Step 310: Collect a historical energy efficiency parameter online. An energy efficiency parameter (which may be understood as a historical energy efficiency parameter) of at least one frame before a current frame is collected online, and different modules for processing the current frame correspond to different energy efficiency parameters. Specifically, for the energy efficiency parameter that is required to process the current frame and that corresponds to the at least one module shown in FIG. 1, refer to the description in the step 210. Details are not described herein again.

Step 320: Quantize the historical energy efficiency parameter. The historical energy efficiency parameter may be quantized, and the quantization may be understood as discretizing an instantaneous value of the historical energy efficiency parameter collected online into a value that can be clearly measured.

The following describes in detail a process of quantizing historical energy efficiency parameters of the first eight frames with reference to FIG. 1 by using an example in which the module for processing the current frame of the image is the CPU 110 shown in FIG. 1 and the energy efficiency parameter is a quantity of instructions for processing the current frame by the CPU 110.

TABLE 1

Schematic table of energy efficiency parameter quantization

| | First frame | Second frame | Third frame | Fourth frame | Fifth frame | Sixth frame | Seventh frame | Eighth frame |
|---|---|---|---|---|---|---|---|---|
| Raw data | $1 \times 10^8$ | $5 \times 10^8$ | $6 \times 10^8$ | $9 \times 10^8$ | $8 \times 10^8$ | $2 \times 10^8$ | $7 \times 10^8$ | $1 \times 10^8$ |
| Quantized data | 1 | 5 | 6 | 9 | 8 | 2 | 7 | 1 |

Referring to Table 1, for the quantity of instructions of the first eight frames of the current frame, a quantity of instructions for processing the first frame by the CPU is $1 \times 10^8$, and $1 \times 10^8$ may be quantized to 1. The quantity of instructions for processing the second frame by the CPU is $5 \times 10^8$, and $5 \times 10^8$ may be quantized to 5. By analogy, quantities of instructions for processing different frames by the CPU may be quantized.

Step 330: Establish a prediction table of an energy efficiency parameter change. The prediction table of the energy efficiency parameter change may be established based on the quantization manner of the energy efficiency parameter in the step 320. It should be understood that the load prediction table may indicate a change trend of a plurality of historical energy efficiency parameters, or may directly indicate a correspondence between a plurality of historical energy efficiency parameters and the predicted energy efficiency parameter. Therefore, the energy efficiency parameter for processing the current frame of the image by the at least one module shown in FIG. 1 may be predicted based on a change law of the energy efficiency parameter in the prediction table of the energy efficiency parameter change. It may be understood that the prediction table of the energy efficiency parameter change may be established in real time or established when an apparatus is in an idle state or in a charging state.

It should be noted that the energy efficiency parameter for processing the current frame by the at least one module may be predicted based on the energy efficiency parameter of the at least one frame before the current frame. In this embodiment of this application, an example in which the energy efficiency parameter for processing the current frame by the at least one module is predicted based on energy efficiency parameters of three frames before the current frame is used for description.

With reference to Table 2, the following describes in detail a process of predicting, based on a quantity of instructions of the first three frames in the prediction table, a quantity of instructions for processing the current frame by the CPU by using an example in which the module for processing the current frame of the image is the CPU, and the predicted energy efficiency parameter is the quantity of instructions for processing the current frame by the CPU.

TABLE 2

Prediction table of a quantity of instructions changes

|     | 1 | 2 | 3 | 4 | 5  | 6 | 7 | 8 | 9 |
|-----|---|---|---|---|----|---|---|---|---|
| 573 | 0 | 0 | 0 | 2 | 19 | 8 | 6 | 0 | 0 |
| 574 | 0 | 0 | 0 | 7 | 3  | 0 | 0 | 0 | 0 |
| 575 | 0 | 0 | 0 | 8 | 0  | 0 | 0 | 0 | 0 |

Referring to Table 2, a probability of each quantized value of the current frame may be obtained through statistics based on a change law after the energy efficiency parameter of the at least one frame before the current frame is quantized, and a quantized value with a maximum probability may be used as a predicted quantity of instructions for processing the current frame by the CPU. The following provides detailed description with reference to a specific example in Table 2.

For example, after being quantized, the quantities of instructions for processing the three frames by the CPU before the current frame are respectively 5, 7, and 3. Based on a statistical law in Table 2, a probability of a next quantization (current frame) value 5 is the largest (about 54%). In this embodiment of this application, it may be predicted that the quantity of instructions for processing the current frame by the CPU is $5 \times 10^8$ (the quantization value is 5 after quantization).

For another example, after being quantized, the quantities of instructions for processing the three frames by the CPU before the current frame are respectively 5, 7, and 4. Based on the statistical law in Table 2, a probability of a next quantization (current frame) value 4 is the largest (about 70%). In this embodiment of this application, it may be predicted that the quantity of instructions for processing the current frame by the CPU is $4 \times 10^8$ (the quantization value is 4 after quantization).

It should be noted that, after each time the energy efficiency parameter for processing the current frame by the at least one module is predicted, the quantization of the historical energy efficiency parameter in the step 320 and the prediction table of the energy efficiency parameter change in the step 330 may be dynamically updated.

Step 340: Predict the energy efficiency parameter for processing the current frame of the image by the at least one module. The energy efficiency parameter for processing the current frame of the image by the at least one module shown in FIG. 1 may be predicted based on the prediction table of the energy efficiency parameter change in the step 330. For details of the step 340, refer to the operation of the step 210 in the procedure in FIG. 2. The steps 310 to 330 are a process of establishing the load prediction table, and may be considered as a process of pre-generating a table. For details of a subsequent 340 operation, refer to a corresponding procedure in FIG. 2.

In this embodiment of this application, after the energy efficiency parameter for processing the current frame of the image by the at least one module in FIG. 1 is predicted, a preset frequency that meets a requirement and that corresponds to the at least one module may be selected based on the predicted energy efficiency parameter for processing the current frame and an energy efficiency requirement. In addition, a working frequency of each of the at least one module shown in FIG. 1 for processing the current frame may be scaled to a corresponding preset frequency.

The energy efficiency requirement is not specifically limited in this embodiment of this application. In an example, the energy efficiency requirement may be a performance requirement that is met by the at least one module that processes the current frame of the image. For example, a running time period of the at least one module that processes the current frame of the image is less than or equal to a preset threshold. In another example, the energy efficiency requirement may alternatively be a performance requirement and an energy consumption requirement that are met by the at least one module that processes the current frame of the image.

With reference to a specific example in FIG. 4, the following describes in more detail a specific implementation of selecting, based on the predicted energy efficiency parameter for processing the current frame and the performance requirement, the preset frequency that meets the requirement and that corresponds to the at least one module in this embodiment of this application. It should be noted that the example in FIG. 4 is merely intended to help a person skilled in the art understand the embodiments of this application, instead of limiting the embodiments of this application to a specific value or a specific scenario shown in the example. A person skilled in the art can apparently make various equivalent modifications or changes according to the examples shown in FIG. 4, and such modifications and changes also fall within the scope of the embodiments of this application.

FIG. 4 is a schematic flowchart of a possible preset frequency selection method according to an embodiment of this application. The method in FIG. 4 may include steps 410 to 430. The following separately describes steps 410 to 430 in detail.

Step 410: Collect energy efficiency parameters of all frequencies or frequency combinations of the at least one module offline. In this embodiment of this application, the energy efficiency parameters of all frequencies or frequency combinations of the at least one module (the CPU, the GPU, the DDR, or the NPU module) that processes the image and that is shown in FIG. 1 may be collected offline. It should be understood that modules of different models may correspond to different frequency sets, and an energy efficiency parameter of each frequency or frequency combination may be collected based on one or more modules that process the current frame of the image.

It should be further understood that the at least one module may separately process the current frame of the image, or a plurality of modules may be randomly combined to process the current frame of the image. In an example, if only the CPU processes the current frame of the image, an energy efficiency parameter of the CPU at each frequency may be collected. In another example, if the CPU and the DDR process the current frame of the image, the energy efficiency parameter of the CPU and the DDR at each frequency combination may be collected.

For the energy efficiency parameter of the at least one module, refer to the description of the energy efficiency parameter for processing the current frame by different modules in the step 210. Details are not described herein again.

Step 420: Deduce a performance formula of the at least one module offline. In this embodiment of this application, the performance formula y=f(x) of the at least one module may be deduced based on a running parameter (for example, the running time period) and the energy efficiency parameter that are of the at least one module.

It should be understood that the performance formula y=f(x) may be used to indicate a function relationship between the running parameter (for example, the running time period) and the energy efficiency parameter that are of the at least one module, where x may be an independent variable (for example, the energy efficiency parameter of the at least one module), and y may be a dependent variable (for example, a running time period for processing any frame by the at least one module).

The performance formula y=f(x) is not specifically limited in this embodiment of this application. The function relationship between x and y may be linear, or may be non-linear.

The following uses a linear performance formula y=f(x) as an example, to describe a performance formula of each module.

In an example, for the CPU, y in the performance formula y=f(x) may be a CPU running time (CPU running time) period, and x may be one or more of the following parameters: instructions, L1 data cache misses, L2 data cache misses, FE bound, or BE bound.

For example, a performance formula of the CPU may be expressed as:

$$\text{CPU running time} = W0 \times \text{instructions} + W1 \times FE \text{ bound} + W2 \times BE \text{ bound } W3 \quad (1)$$

W0 to W3 are weight parameters.

The "instructions" is the quantity of instructions for processing any frame of the image by the CPU.

The "FE bound" is a quantity of times that no instruction is executed by the CPU due to frontend.

The "BE bound" is a quantity of times that a queue is congested due to backend when an instruction is executed by the CPU.

For another example, the performance formula of the CPU may alternatively be expressed as:

$$\text{CPU running time} = W0 \times \text{instructions} + W1 \times L1 \text{ misses} + W2 \times L2 \text{ misses} + W3 \quad (2)$$

The "L1 misses" is the quantity of times of the level-1 data cache misses when the CPU processes any frame of the image.

The "L2 misses" is the quantity of times of the level-2 data cache misses when the CPU processes any frame of the image.

In another example, for the GPU, y in the performance formula y=f(x) may be a GPU running time period, and x may be one or more of the following parameters: draw calls, triangles, total-FRAG, or TEX-operation.

For example, a performance formula of the GPU may be expressed as:

$$\text{GPU running time} = W0 \times \text{draw calls} + W1 \times \text{triangles} + W2 \times \text{total-FRAG} + W3 \times \text{TEX-operation} + W4 \quad (3)$$

The "draw calls" is a quantity of draw calls for processing any frame of the image by the GPU.

The "triangles" is a quantity of drawn triangles for processing any frame of the image by the GPU.

The "total-FRAG" is a quantity of pixel drawing times when the GPU processes any frame of the image.

The "TEX-operation" is a quantity of texture drawing times when the GPU processes any frame of the image.

In another example, for the NPU, y in the performance formula y=f(x) may be an NPU running time period, and x may be one or more of the following parameters: tasks, total-INSTR-EXEC, and total-MEM-request.

For example, a performance formula of the NPU may be expressed as:

$$\text{NPU running time} = W0 \times \text{tasks} + W1 \times \text{total-INSTR-EXEC} + W2 \times \text{total-MEM-request} + W3 \quad (4)$$

The "tasks" is a calculation amount required when the NPU processes any frame of the image.

The "total-INSTR-EXEC" is a quantity of instructions required when the NPU processes any frame of the image.

The "total-MEM-request" is a quantity of times that the NPU requests to access a memory when NPU processes any frame of the image.

Step 430: Select, according to the performance formula and the predicted energy efficiency parameter for processing the current frame, a frequency set that meets a performance requirement. The step 410 and the step 420 are offline operations, and the step 430 is online calculation. For a specific process of the step 430, refer to the step 220 shown in FIG. 2. To be specific, the step 403 is after the step 410 and the step 420. For a specific online operation, refer to a corresponding process in FIG. 2. In this embodiment of this application, a subset S that meets a preset condition may be selected from all frequencies or frequency combinations of the at least one module based on the performance formula y=f(x) in the step 430 and the predicted energy efficiency parameter for processing the current frame by the at least one module.

It should be understood that the preset condition may be less than or equal to a time threshold. In an example, the time threshold may be duration that is required by each frame and that is obtained through calculation based on a target frame rate. A 60-frame game is used as an example, and duration required by each frame is 16.6 ms (1000/60).

Specifically, the predicted energy efficiency parameter for processing the current frame by the at least one module may be used as an input, and is substituted into a performance formula y=f(x) of the corresponding module. In addition, a frequency subset S (the frequency subset S includes a preset frequency corresponding to each of the at least one module) whose running time period of the corresponding module is less than or equal to a time threshold may be selected from all frequencies or frequency combinations of the at least one module.

In this embodiment of this application, a working frequency of each of the at least one module for processing the current frame may be scaled to the preset frequency corresponding to each of the at least one module in the subset S, and the at least one corresponding module may process the current frame at the preset frequency, so that the performance requirement can be met.

FIG. 5 is a possible schematic diagram of selecting a preset frequency according to an embodiment of this application. In FIG. 5, an example in which frequency scaling needs to be performed on the CPU 110 and the memory 130 (for example, the DDR) shown in FIG. 1 (in other words, the CPU 110 and the memory 130 (for example, the DDR) process a current frame of an image) is used. A frequency combination set T in FIG. 4 may be a combination of all frequencies of the CPU 110 and the memory 130 (for example, the DDR).

For example, the frequency combination set T may be:

Frequency combination 1: CPU frequency 1/DDR frequency 1 $\{W_{10}, W_{11}, W_{12}, W_{13}\}$ Frequency combination 2: CPU frequency 1/DDR frequency 2 $\{W_{20}, W_{21}, W_{22}, W_{23}\}$ Frequency combination 3: CPU frequency 1/DDR frequency 3 $\{W_{30}, W_{31}, W_{32}, W_{33}\}$ Frequency combination n: CPU frequency 1/DDR frequency n $\{W_{n0}, W_{n1}, W_{n2}, W_{n3}\}$ Frequency combination n+1: CPU frequency 2/DDR frequency 1 $\{W_{(n+1)0}, W_{(n+1)1}, W_{(n+1)2}, W_{(n+1)3}\}$ Frequency combination n+2: CPU frequency 2/DDR frequency 2 $\{W_{(n+2)0}, W_{(n+2)1}, W_{(n'2)2}, W_{(n+2)3}\}$ Frequency combination 2n: CPU frequency 2/DDR frequency n$\{W_{(2n)0}, W_{(2n)1}, W_{(2n)2}, W_{(2n)3}\}$ Frequency combination m×n: CPU frequency m/DDR frequency n$\{W_{(m\times n)0}, W_{(nm\times n)2}, W_{(m\times n)2}, W_{(m\times n)3}\}$ It should be understood that different frequencies m or n are set for modules of different models. This is not specifically limited in this application.

It should be further understood that $\{W_{00}, W_{01}, W_{02}, W_{03}\}$ in the foregoing frequency combination may correspond to a weight $W_x$ in a performance formula in the frequency combination.

In this embodiment of this application, a subset S that meets a performance requirement may be selected from the frequency combination set T according to the performance formula in the step 420.

For example, the subset S that meets the performance requirement may be:

Frequency combination 1: CPU frequency 1/DDR frequency 1 $\{W_{00}, W_{01}, W_{02}, W_{03}\}$ Frequency combination 2: CPU frequency 1/DDR frequency 2 $\{W_{10}, W_{11}, W_{12}, W_{13}\}$ Frequency combination 3: CPU frequency 1/DDR frequency 3 $\{W_{20}, W_{21}, W_{22}, W_{23}\}$ Frequency combination 4: CPU frequency 2/DDR frequency 1 $\{W_{30}, W_{31}, W_{32}, W_{33}\}$ Frequency combination 5: CPU frequency 2/DDR frequency 3 $\{W_{40}, W_{41}, W_{42}, W_{43}\}$ Frequency combination 6: CPU frequency 3/DDR frequency 3 $\{W_{50}, W_{51}, W_{52}, W_{53}\}$ Frequency combination 7: CPU frequency 4/DDR frequency 1 $\{W_{60}, W_{61}, W_{62}, W_{63}\}$ Frequency combinations of the CPU and the DDR that are included in the subset S in FIG. 5 meets the performance requirement, and working frequencies at which the CPU and the DDR process the current frame of the image may be scaled to any frequency combination in the six frequency combinations (the subset S).

FIG. 5 is the subset S that meets the performance requirement and that is selected from all frequencies or frequency combinations of the at least one module based on the performance requirement. Optionally, in some embodiments, based on FIG. 5, a frequency set M corresponding to lowest power consumption may be selected from the subset S according to a power consumption formula. A specific implementation of selecting, from the subset S, the frequency set M corresponding to the lowest power consumption is described below with reference to FIG. 6. Details are not described herein again.

In this embodiment of this application, a power consumption formula p=f(y) of the at least one module may be deduced based on a power consumption parameter and the energy efficiency parameter that are of the at least one module.

It should be understood that the power consumption formula p=f(y) may be used to indicate a function relationship between the power consumption parameter and the energy efficiency parameter that are of the at least one module, where y may be an independent variable (y may be an output value of the performance formula, for example, the running time period for processing any frame by the at least one module); and p may be a dependent variable (for example, power consumption for processing the current frame of the image by the at least one module).

The power consumption formula p=f(y) is not specifically limited in this embodiment of this application. The function relationship between y and p may be linear, or may be non-linear.

The following uses a linear power consumption formula p=f(y) as an example to describe how to predict, based on the predicted energy efficiency parameter of the at least one module, the power consumption corresponding to the frequency or frequency combination in the subset S.

For example, if frequency scaling needs to be performed on the CPU and the DDR module (in other words, the CPU and the DDR module process the current frame of the image), a frequency combination of the CPU and the DDR may be in the subset S, and power consumption corresponding to the frequency combination of the CPU and the DDR in the subset S may be predicted according to the following power consumption formula p=f(y).

The formula for calculating the total power consumption of the CPU and DDR is as follows:

$$\text{power} \approx W0 \times \text{frame duration} + W1 \times \text{CPU running time} + W2 \times \text{bandwidth} + W3 \quad (5)$$

W0 to W3 are weight parameters.

The "frame duration" is a reciprocal of a target frame rate.

The "CPU running time" is a running time period required when the CPU processes any frame of the image.

The "bandwidth" is total bandwidths required when the DDR stores or reads any frame of the image.

It should be noted that the independent variable y in the power consumption formula p=f(y) may be combined based on the modules in the subset S. If frequency scaling needs to be performed only on the CPU and the DDR in the subset S, a calculated GPU running time period and an NPU running time period do not need to be involved in the calculation of the total power consumption.

For another example, if frequency scaling needs to be performed on modules (the CPU, the GPU, the NPU, and the DDR) of the entire system, a formula for calculating the total power consumption required by the CPU, the GPU, the NPU, and the DDR may be expressed as:

$$\text{power} \approx W0 \times \text{frame duration} + W1 \times \text{CPU running time} + W2 \times \text{GPU running time} + W3 \times \text{NPU running time} + W4 \times \text{bandwidth} + W5 \quad (6)$$

W0 to W5 are weight parameters.

The "GPU running time" is a running time period required when the GPU processes any frame of the image.

The "NPU running time is a running time period required when the NPU processes any frame of the image.

Figure 6:
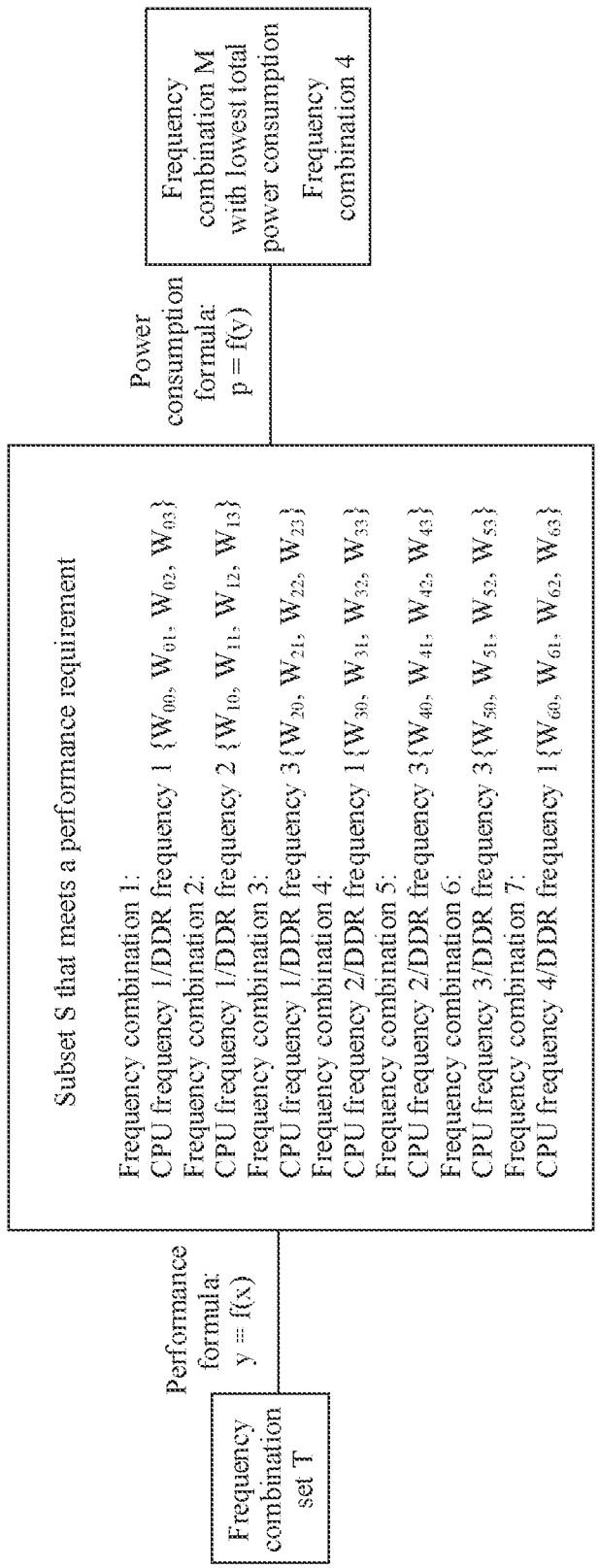
FIG. 6 is a possible schematic diagram of selecting a preset frequency according to another embodiment of this application.

With reference to a specific example in FIG. 6, the following describes in more detail a specific implementation of selecting, from the subset S in this embodiment of this application, the frequency set m corresponding to the lowest power consumption. It should be noted that the example in FIG. 6 is merely intended to help a person skilled in the art understand the embodiments of this application, instead of limiting the embodiments of this application to a specific value or a specific scenario shown in the example. A person skilled in the art can apparently make various equivalent modifications or changes according to the examples shown in FIG. 6, and such modifications and changes also fall within the scope of the embodiments of this application.

FIG. 6 is a possible schematic diagram of selecting a preset frequency according to another embodiment of this application. In FIG. 6, an example in which frequency scaling needs to be performed on the CPU 110 and the memory 130 (for example, the DDR) shown in FIG. 1 (in other words, the CPU 110 and the memory 130 (for example, the DDR) shown in FIG. 1 process a current frame of an image) is used.

cies at which the CPU and DDR process the current frame of the image can be scaled to frequencies in the frequency combination M.

For example, the frequency combination M with the lowest total power consumption required by the CPU and the DDR may be:

Frequency combination 4: CPU frequency 2/DDR frequency 1 $\{W_{30}, W_{31}, W_{32}, W_{33}\}$ It should be noted that there may be one or more frequency combinations M with lowest total power consumption required by the CPU and the DDR. This is not specifically limited in this embodiment of this application.

According to the frequency scaling method provided in this embodiment of this application, a load change requirement can be responded to in time in a frequency scaling process, and a good performance gain and/or a power consumption reduction gain can be obtained.

The following uses overall performance of some games as an example to describe in detail, with reference to Table 3, overall performance and power consumption reduction gains of the games after the frequency scaling method (the AI frequency scaling method) in this embodiment of this application is used.

TABLE 3

Comparison of benefits before and after AI frequency scaling scheduling is implemented

| Number | Game scenario | Test version | Full frame rate | Average frame rate/frame | Smoothness | Video freeze rate | Energy efficiency benefit proportion |
|---|---|---|---|---|---|---|---|
| 1 | Anipop | Disable AI frequency scaling scheduling | 60 | 56 | 4.81 | 0.00% | 9.11% |
| | | Enable AI frequency scaling scheduling | 60 | 57.89 | 2.39 | 0.00% | |
| 2 | Wild Island Special Training - Field | Disable AI frequency scaling scheduling | 60 | 52.46 | 3.56 | 3.28% | 4.26% |
| | | Enable AI frequency scaling scheduling | 60 | 58.21 | 2.53 | 0.00% | |
| 3 | Arena of Valor 60 fps | EMUI 8.0 commercial version | 60 | 51.35 | 3.62 | 9.13 | 9.13% |
| | | Enable AI frequency scaling scheduling | 60 | 58.13 | 1.21 | 0.00% | |
| 4 | Onmyoji | EMUI 8.0 commercial version | 30 | 26.33 | 1.87 | 1.00% | 1.33% |
| | | Enable AI frequency scaling scheduling | 30 | 29.28 | 1.26 | 0.33% | |

Referring to FIG. 6, on the basis of FIG. 5, the frequency combination M with the lowest total power consumption required by the CPU and the DDR may be further selected from the subset S (for example, the foregoing six frequency combinations of the CPU and the DDR that meet the performance requirement) according to the foregoing power consumption formula (5). In addition, the working frequen- Table 3 lists the game performance gains and power consumption reduction gains of some games before and after the AI frequency scaling scheduling is implemented. The game performance benefits mainly lie in the average frame rate, smoothness, and video freeze rate. The closer the average frame rate to the full frame rate, the better the game performance. The smoothness can be used to indicate a standard deviation of a frame rate difference (a difference between a frame rate of a next second and a frame rate of a previous second). A smaller value of the standard deviation indicates better game performance. The video freeze rate can be used to indicate a percentage of the frame rate that is lower than a specified threshold (measured by second). A lower value of the percentage indicates better game performance.

For example, for the Anipop in Table 3, in terms of the average frame rate, the frequency scaling scheduling method (the AI frequency scaling scheduling) provided in this embodiment of this application is not used, and the average frame rate is 56. After the AI frequency scaling scheduling method is used, the average frame rate increases to 57.89. In terms of the smoothness, when the AI frequency scaling scheduling method is not used, the smoothness is 4.81, and after the AI frequency scaling scheduling method is used, the smoothness is reduced to 2.39. In terms of the power consumption reduction gain, after the AI frequency scaling scheduling method provided in this embodiment of this application is used, the energy efficiency benefit proportion of the AI frequency scaling scheduling method increases by 9.11%. Therefore, after the AI frequency scaling scheduling method provided in this embodiment of this application is used, the overall performance of the game is significantly improved, the power consumption is significantly reduced, and the energy efficiency benefit of the game is obvious.

According to the frequency scaling method provided in this embodiment of this application, the running time period required by the at least one module to process the current frame is relatively accurately predicted.

With reference to Table 4 and Table 5, the following describes in detail that the running time period required by the at least one module to process the current frame can be relatively accurately predicted after the frequency scaling method provided in this embodiment of this application is used.

TABLE 4

AI frequency sealing scheduling prediction accuracy rate

| Game scenario | Predicted accuracy rate |
| --- | --- |
| Arena of Valor | 98.53% |
| Onmyoji | 98.70% |
| QQ Speed | 98.65% |
| NBA2018 | 98.55% |
| Honkai Impact 3rd | 98.39% |

It can be learned from Table 4 that, after the frequency scaling method provided in this embodiment of this application is used, the running time period required by the at least one module to process the current frame can be relatively accurately predicted.

The following uses the predicted frame running time period required for running the QQ Speed in Table 4 as an example to describe in detail, with reference to Table 5, a deviation between the running time period required by the at least one module to process the current frame and an actual running time period.

TABLE 5

AI frequency scaling scheduling prediction accuracy rate

| Domain | Index | Count | Mean square error (MSB) | Median absolute deviation (MAD) |
| --- | --- | --- | --- | --- |
| 1 | 34 | 4 | 0.0002 | 0.0115 |
| 1 | 48 | 12 | 0.0012 | 0.0172 |

TABLE 5-continued

AI frequency scaling scheduling prediction accuracy rate

| Domain | Index | Count | Mean square error (MSB) | Median absolute deviation (MAD) |
| --- | --- | --- | --- | --- |
| 1 | 62 | 7291 | 0.0016 | 0.0135 |
| 2 | 0 | 1 | 0.0021 | 0.0458 |

It can be learned from Table 5 that the frequency scaling method in this embodiment of this application may be applicable but is not limited to the game field, the video field, or another general application field.

Referring to Table 5, in a column whose index is 62, a median absolute deviation MAD of the game is 0.0135, and a corresponding prediction accuracy rate of the game is 98.65% (1-0.0135).

It should be understood that the MAD collects statistics on a deviation value between the running time period required by the at least one module to process the current frame and the actual running time period.

The foregoing describes in detail, with reference to FIG. 1 to FIG. 6, the frequency scaling method provided in the embodiments of the present invention. The following describes in detail an apparatus embodiment of this application with reference to FIG. 7. It should be understood that the descriptions of the method embodiments correspond to descriptions of the apparatus embodiments. Therefore, for parts that are not described in detail, refer to the foregoing method embodiments.

Figure 7:
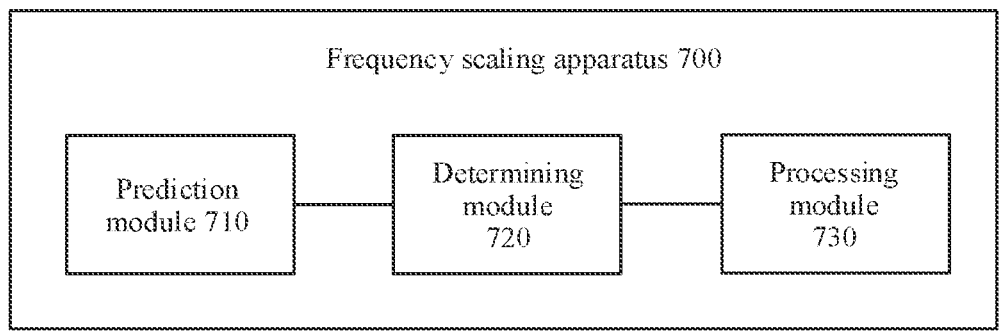
FIG. 7 is a schematic block diagram of a frequency scaling apparatus 700 according to an embodiment of this application.

FIG. 7 is a schematic block diagram of a frequency scaling apparatus 700 according to an embodiment of this application. Modules in the frequency scaling apparatus 700 are separately configured to perform actions or processing processes in the foregoing method. Herein, for detailed descriptions, refer to the foregoing descriptions.

FIG. 7 is a schematic block diagram of a frequency scaling apparatus 700 according to an embodiment of this application. The frequency scaling apparatus 700 may include a prediction module 710, a determining module 720, and a processing module 730. The prediction module 710 is configured to predict an energy efficiency parameter for processing a current frame of an image by at least one module, where the at least one module includes at least one of a central processing unit (CPU), a graphics processing unit (GPU), a memory configured to store the current frame, or a neural network processing unit (NPU). The determining module 720 is configured to select, from a plurality of frequency sets based on the predicted energy efficiency parameter, a first frequency set that meets an energy efficiency requirement, where the first frequency set includes a preset frequency corresponding to each of the at least one module. The processing module 730 is configured to scale a working frequency of each of the at least one module for processing the current frame to the preset frequency corresponding to each of the at least one module.

Optionally, in some embodiments, the energy efficiency parameter includes at least one of the following: a quantity of instructions for processing the current frame by the CPU, a cache miss generated when the CPU processes the current frame, a quantity of draw calls for processing the current frame by the GPU, a bandwidth for storing or reading the current frame by the memory, or a calculation amount for processing the current frame by the NPU.

Optionally, in some embodiments, the energy efficiency requirement includes at least one of the following: a power consumption requirement or a performance requirement.

Optionally, in some embodiments, the power consumption requirement is a minimum power consumption requirement, and the performance requirement is that a performance characteristic meets a preset threshold.

Optionally, in some embodiments, the determining module 720 is specifically configured to: predict, based on the predicted energy efficiency parameter, a performance characteristic corresponding to each frequency set; and select, from the plurality of frequency sets, the first frequency set corresponding to the performance characteristic meeting the preset threshold.

Optionally, in some embodiments, the determining module 720 is further specifically configured to: predict, based on the predicted energy efficiency parameter, power consumption corresponding to each frequency set; select, from the plurality of frequency sets, a plurality of second frequency sets corresponding to a plurality of performance characteristics meeting the preset threshold; and select, from the plurality of second frequency sets, the first frequency set corresponding to lowest power consumption.

Optionally, in some embodiments, the prediction module 710 is specifically configured to predict, based on a historical energy efficiency parameter, the energy efficiency parameter for processing the current frame of the image by the at least one module, where the historical energy efficiency parameter is obtained based on an energy efficiency parameter of at least one frame before the current frame.

Optionally, in some embodiments, the prediction module 710 is specifically configured to search a load prediction table based on the historical energy efficiency parameter, to predict the energy efficiency parameter for processing the current frame of the image by the at least one module.

It may be understood that modules 710 to 730 in the frequency scaling apparatus 700 corresponding to FIG. 7 may be implemented by using software, hardware, or a combination thereof. If the frequency scaling apparatus 700 is implemented by using hardware, the frequency scaling apparatus 700 is a hardware circuit, and each module may be considered as a circuit unit, including at least one of a digital circuit, a logic circuit, an analog circuit, a hardware accelerator, or an algorithm circuit. In this case, the frequency scaling apparatus 700 may be considered as dedicated hardware, for example, may be considered as a hardware accelerator 160 or a part of the hardware accelerator 160 in the system in FIG. 1.

Alternatively, the frequency scaling apparatus 700 may be formed by a software program. Each module includes a program instruction, which is run by a processor, such as the CPU 110 in the system in FIG. 1, to implement a related function. In other words, each module is a software module, and may run on the CPU 110 shown in FIG. 1. For details, refer to the foregoing description.

Alternatively, some modules in the frequency scaling apparatus 700 are hardware circuits, and may be the hardware accelerator 160 in the system in FIG. 1. The other modules are processors, for example, software modules executed by the CPU 110 in FIG. 1. This is not limited in this embodiment.

An embodiment of this application further provides a chip, including a memory and an interface that couples the processor to an outer part of the chip. For example, the interface may be coupled to a memory outside the chip, and the memory may be configured to store program code and data of the device. The processor may read program code from the memory by using the interface, to perform the operation. For specific descriptions of the memory and the processor, refer to the descriptions in the foregoing embodiments. Details are not described herein again.

An embodiment of this application further provides a computer-readable storage medium, including a computer program. When the computer program runs on a computer or a processor, the computer or the processor is enabled to perform the method in the steps such as the steps 210 to 230.

An embodiment of this application further provides a computer program product. When the computer program product runs on a computer or a processor, the computer or the processor is enabled to perform the method in the steps such as the steps 210 to 230.

Any method procedure in FIG. 2 to FIG. 4 may be executed by a processor. The processor may be a general-purpose processor, and may implement an operation of the procedure by using hardware, or may implement a related operation by executing software. When the operation is implemented by the hardware, the processor may include a microprocessor, a digital signal processor, a microcontroller, the CPU 110 in the foregoing embodiment, or the like that has a logic circuit, an integrated circuit, or the like. A function is implemented by reading software code stored in the memory. The memory may be integrated into the processor, or may be located outside the processor and exist independently. Further, the processor may include a necessary hardware accelerator, for example, a hardware algorithm circuit, a logical operation circuit, or an analog circuit that does not depend on software to perform an operation.

In a typical implementation, the method procedure in the previous embodiment is performed by the CPU 110. The CPU 110 implements the method procedure by executing a program in the memory 130, to perform frequency scaling on a plurality of modules in a system, including the CPU 110. It may be understood that an online operation is an operation performed by the CPU 110 or another processor. The offline operation may be performed by a person skilled in the art in a development process before the apparatus is delivered from a factory, and an obtained result, for example, a performance formula in the embodiment, is preset in the apparatus. The performance formula may be preset in the apparatus in a form of software or hardware algorithm circuit.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

Terminologies such as "component", "module", and "system" used in this specification are used to indicate entities, hardware, firmware, combinations of hardware and software, software, or software being executed. It should be understood that division of manners, cases, types, and embodiments in the embodiments of this application are merely for ease of description, but should not constitute any special limitation, and features in various manners, types, cases, and embodiments may be combined when there is no contradiction.

It should be further understood that the terms "first", "second", and "third" in this embodiment of this application are used for distinguishing purposes only, and should not be construed as any limitation on this application. It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application. It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

It should be noted that the term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. "At least one" means "one" or "more". "At least one" means one or more; "At least one of A and B", similar to "A and/or B", describes an association relationship between the associated objects, and indicates that three relationships may exist. For example, at least one of A and B may represent the following three cases: Only A exists, both A and B exist, and only B exists. The technical solutions provided in this application are described in detail below with reference to the accompanying drawings.

In addition, aspects or features of this application may be implemented as a method, an apparatus or a product that uses standard programming and/or engineering technologies. The term "product" used in this application covers a computer program that can be accessed from any computer readable component, carrier or medium. For example, the computer-readable medium may include but is not limited to: a magnetic storage component (for example, a hard disk, a floppy disk or a magnetic tape), an optical disc (for example, a compact disc (CD), or a digital versatile disc (DVD)), a smart card, and a flash memory component (for example, erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

When the functions are implemented in the form of a software functional unit and sold or used as an independent product, the functions may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes a plurality of instructions for instructing a computer device (which may be a personal computer, a server, or a device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A frequency scaling method, wherein the method comprises:
    predicting an energy efficiency parameter for processing a current frame of an image by at least one module, wherein the at least one module comprises at least one of a central processing unit (CPU), a graphics processing unit (GPU), a memory configured to store the current frame, or a neural network processing unit (NPU), and the energy efficiency parameter comprises at least one of the following: a quantity of instructions for processing the current frame by the CPU, a cache miss generated when the CPU processes the current frame, a quantity of draw calls for processing the current frame by the GPU, a bandwidth for storing the current frame by the memory, or a calculation amount for processing the current frame by the NPU;
    selecting a first frequency set from a plurality of frequency sets based on the predicted energy efficiency parameter, wherein the first frequency set comprises a preset frequency corresponding to each of the at least one module; and
    scaling a working frequency of each of the at least one module for processing the current frame to the preset frequency corresponding to each of the at least one module.

2. The method according to claim 1, wherein the first frequency set meets an energy efficiency requirement, and the energy efficiency requirement comprises at least one of the following: a power consumption requirement or a performance requirement.

3. The method according to claim 2, wherein the power consumption requirement is a minimum power consumption requirement, and the performance requirement is that a performance characteristic meets a preset threshold.

4. The method according to claim 2, wherein the selecting a first frequency set from a plurality of frequency sets based on the predicted energy efficiency parameter comprises:
    predicting, based on the predicted energy efficiency parameter, a performance characteristic corresponding to each frequency set; and
    selecting, from the plurality of frequency sets, the first frequency set corresponding to the performance characteristic meeting a preset threshold.

5. The method according to claim 4, wherein the selecting, from the plurality of frequency sets, the first frequency set corresponding to the performance characteristic meeting the preset threshold comprises:
    predicting, based on the predicted energy efficiency parameter, power consumption corresponding to each frequency set;

selecting, from the plurality of frequency sets, a plurality of second frequency sets corresponding to a plurality of performance characteristics meeting the preset threshold; and selecting, from the plurality of second frequency sets, the first frequency set corresponding to lowest power consumption.

6. The method according to claim 1, wherein the predicting an energy efficiency parameter for processing a current frame of an image by at least one module comprises:

predicting, based on a historical energy efficiency parameter, the energy efficiency parameter for processing the current frame of the image by the at least one module, wherein the historical energy efficiency parameter is obtained based on an energy efficiency parameter of at least one frame before the current frame.

7. The method according to claim 6, wherein the predicting, based on a historical energy efficiency parameter, the energy efficiency parameter for processing the current frame of the image by the at least one module comprises:

searching a load prediction table based on the historical energy efficiency parameter, to predict the energy efficiency parameter for processing the current frame of the image by the at least one module.

8. A frequency scaling apparatus, comprising:

a non-transitory memory storage comprising instructions; and one or more hardware processors in communication with the non-transitory memory storage, wherein the one or more hardware processors execute the instructions to:

predict an energy efficiency parameter for processing a current frame of an image by at least one module, wherein the at least one module comprises at least one of a central processing unit (CPU), a graphics processing unit (GPU), a memory configured to store the current frame, or a neural network processing unit (NPU), and the energy efficiency parameter comprises at least one of the following: a quantity of instructions for processing the current frame by the CPU, a cache miss generated when the CPU processes the current frame, a quantity of draw calls for processing the current frame by the GPU, a bandwidth for storing the current frame by the memory, or a calculation amount for processing the current frame by the NPU;

select a first frequency set from a plurality of frequency sets based on the predicted energy efficiency parameter, wherein the first frequency set comprises a preset frequency corresponding to each of the at least one module; and scale a working frequency of each of the at least one module for processing the current frame to the preset frequency corresponding to each of the at least one module.

9. The apparatus according to claim 8, wherein the first frequency set meets an energy efficiency requirement, and the energy efficiency requirement comprises at least one of the following: a power consumption requirement or a performance requirement.

10. The apparatus according to claim 9, wherein the power consumption requirement is a minimum power consumption requirement, and the performance requirement is that a performance characteristic meets a preset threshold.

11. The apparatus according to claim 9, wherein the one or more hardware processors further execute the instructions to:

predict, based on the predicted energy efficiency parameter, a performance characteristic corresponding to each frequency set; and select, from the plurality of frequency sets, the first frequency set corresponding to the performance characteristic meeting a preset threshold.

12. The apparatus according to claim 11, wherein the one or more hardware processors further execute the instructions to:

predict, based on the predicted energy efficiency parameter, power consumption corresponding to each frequency set;

select, from the plurality of frequency sets, a plurality of second frequency sets corresponding to a plurality of performance characteristics meeting the preset threshold; and select, from the plurality of second frequency sets, the first frequency set corresponding to lowest power consumption.

13. The apparatus according to claim 8, wherein the one or more hardware processors further execute the instructions to:

predict, based on a historical energy efficiency parameter, the energy efficiency parameter for processing the current frame of the image by the at least one module, wherein the historical energy efficiency parameter is obtained based on an energy efficiency parameter of at least one frame before the current frame.

14. The apparatus according to claim 13, wherein the one or more hardware processors further execute the instructions to:

search a load prediction table based on the historical energy efficiency parameter, to predict the energy efficiency parameter for processing the current frame of the image by the at least one module.

15. A non-transitory computer-readable storage medium, comprising a computer program, wherein when running on a computer or a processor, the computer program enables the computer or the processor to execute a frequency scaling operation that comprises:

predicting an energy efficiency parameter for processing a current frame of an image by at least one module, wherein the at least one module comprises at least one of a central processing unit (CPU), a graphics processing unit (GPU), a memory configured to store the current frame, or a neural network processing unit (NPU), and the energy efficiency parameter comprises at least one of the following: a quantity of instructions for processing the current frame by the CPU, a cache miss generated when the CPU processes the current frame, a quantity of draw calls for processing the current frame by the GPU, a bandwidth for storing the current frame by the memory, or a calculation amount for processing the current frame by the NPU;

selecting a first frequency set from a plurality of frequency sets based on the predicted energy efficiency parameter, wherein the first frequency set comprises a preset frequency corresponding to each of the at least one module; and scaling a working frequency of each of the at least one module for processing the current frame to the preset frequency corresponding to each of the at least one module.

16. The computer-readable storage medium according to claim 15, wherein the first frequency set meets an energy efficiency requirement, and the energy efficiency requirement comprises at least one of the following: a power consumption requirement or a performance requirement.

17. The computer-readable storage medium according to claim 15, wherein the predicting an energy efficiency parameter for processing a current frame of an image by at least one module comprises:
  predicting, based on a historical energy efficiency parameter, the energy efficiency parameter for processing the current frame of the image by the at least one module, wherein the historical energy efficiency parameter is obtained based on an energy efficiency parameter of at least one frame before the current frame.

* * * * *